Nov. 21, 1933.　　　　A. RUSSELL　　　　1,936,267
SHAPING, FEEDING, AND CUTTING PLASTIC MATERIAL TO FORM UNIFORM PIECES
Filed May 25, 1933　　　2 Sheets-Sheet 1

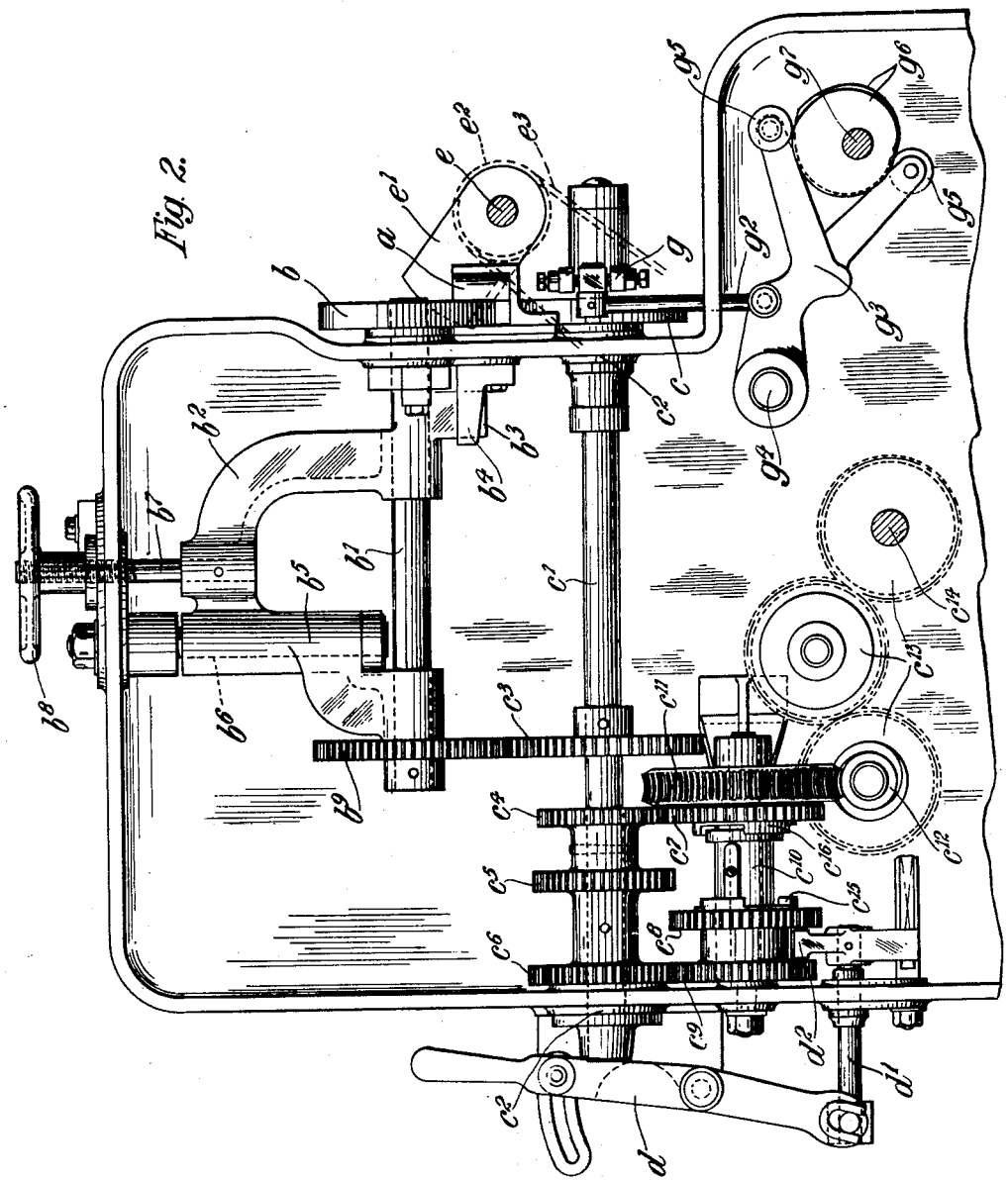

Patented Nov. 21, 1933

1,936,267

UNITED STATES PATENT OFFICE 1,936,267

SHAPING, FEEDING, AND CUTTING PLASTIC MATERIAL TO FORM UNIFORM PIECES

Alexander Russell, Leeds, England, assignor to The Forgrove Machinery Company Limited, Leeds, England Application May 25, 1933, Serial No. 672,898, and in Great Britain August 12, 1932

6 Claims. (Cl. 107—21)

The invention relates to the method of shaping, feeding and cutting of plastic material, such as toffee in a warm condition, using mechanism adapted to control the size and shape of the finished article and to apparatus for carrying out this method. The method usually adopted consists in feeding the mass of plastic material between forming rollers which form said material into a rope, the cross-section of which is determined by the shape of the rollers, while the thickness of the cross-section is determined by the distance apart of said rollers, and in cutting said rope by means of a knife into pieces, the length of which is determined by the speed of the roller feed and the time interval between the successive strokes of the knife.

In practice it is found that plastic materials vary in their behaviour under the above treatment, so that the shape of the pieces eventually produced varies in cross-sectional area as the substance cools. In order to explain this variation, it would be stated that in forming the section by rolling, internal stress in the material which is being pressed to the required size and elongated, is set up, and it is found that there is a contraction in the direction of the length and a corresponding dilation of the section, when the density before and after rolling is constant. If, however, the density increases with the cooling process, excessive longitudinal stresses may cause a contraction in the length without a corresponding increase in sectional area, which would cause the variation in cross-sectional area referred to.

The object of the invention is so to control the formation of the finished cut off piece as to prevent variation of its cross-sectional area due to the gradual relief of internal stresses during cooling of the rope of plastic material to normal atmospheric temperatures.

This object is achieved according to the present invention by providing an additional step in the method, which consists in compressing the end of the rope prior to cutting off each length. The amount of compression will be varied in accordance with the variation of cross-sectional area during cooling.

It is found that the longitudinal stress set up by the rolling, can be counteracted by a local compressing action just prior to cutting off.

In carrying out this method, the feed rollers may be arranged to deliver the formed rope against an abutment which causes the foremost end to be compressed prior to the slicing action of the knife. In the case of a rotary segmental knife, this knife itself may form the abutment by feeding the end of the rope against the segmental width of the blade, the amount of compression will then depend upon the segmental width of the knife, the knife acting as a shutter across the direction of feed. Thus the amount of compression can be varied by fitting knives of different segmental widths.

Alternatively, the amount of compression may be varied by using the same knife so that the segmental width against which the rope end bears is constant and varying the rate of feed of the rope by the rollers against the constant width of the knife.

In the present invention both of these two alternative methods are preferably employed. Knives of different segmental widths may be used, which necessitates stoppage of the machinery, but the speed of the rope is also controlled by a change speed gear which can be operated as the machine is working, so that within the limits of any given knife segment a varying amount of compression can be obtained to suit the conditions, without stopping to fit different knives.

A further adjustment is provided for varying the distance between the feed rolls so that an appropriate thickness of the section rolled may be obtained whilst the machine is in operation, in order to correct for thickness. The end compression eliminates shrinkage effects due to the longitudinal stresses and the thickness adjustment eliminates departure by dilation from a desired standard.

The invention will now be described with reference to the particular embodiment of feeding and severing apparatus shown upon the accompanying drawings, in which:—

Fig. 2 is a front elevation illustrating the mechanism for changing the speed of the rollers and for adjusting the distance between said rollers.

Figure 1:
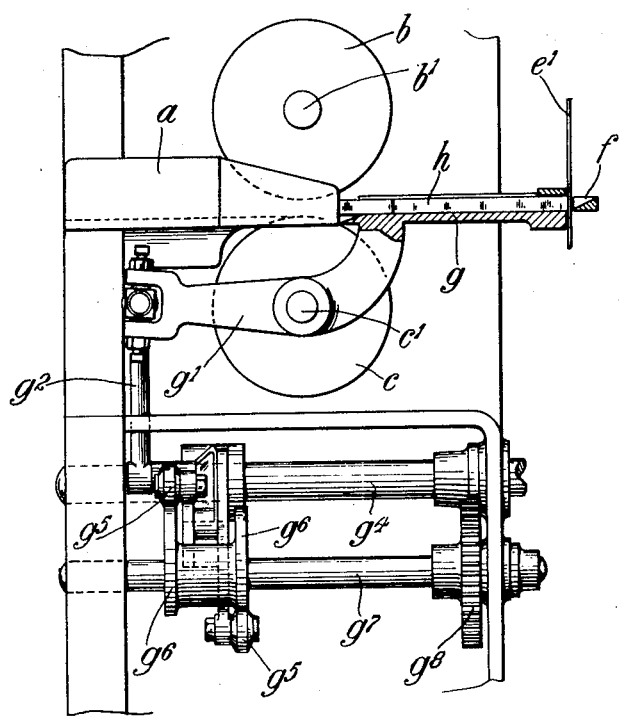
Fig. 1 is a side elevation of the apparatus showing the feeding and forming rollers and the severing knife, with a guide trough for the rope of toffee in section.

In the construction illustrated a trough $a$ is provided for feeding the plastic material through the feeding and shaping rollers $b$ and $c$. These rollers are mounted for continuous rotation on two shafts $b^1$ and $c^1$. The shaft $c^1$ is mounted in fixed bearings $c^2$, while the other shaft $b^1$ is carried by a yoke $b^2$. Said yoke is provided at one side with a depending projection $b^3$ slidably guided by bifurcated projections, only one of which is shown and marked $b^4$, the other being immediately behind. The yoke is provided at the other side with a boss $b^5$ slidably mounted on a fixed spindle $b^6$. The yoke is supported by a screw threaded shank $b^7$ and a hand wheel $b^8$, by the operation of which the shafts $b^1$ and $c^1$ can be adjusted relatively to each other in order to vary the space between the rollers $b$ and $c$ and thus vary the thickness of the rope of plastic material. The adjustable shaft $b^1$ has fixed on it a spur wheel $b^9$ which is driven by a spur wheel $c^3$ on the non-adjustable shaft $c^1$. These spur wheels $b^9$, $c^3$ are provided with large teeth which allow for the slight relative adjustments of the shafts $b^1$, $c^1$ without interrupting the drive. The non-adjustable shaft $c^1$ is driven through change speed gearing comprising three pinions $c^4$, $c^5$, $c^6$ fixed on the shaft $c^1$ meshing or adapted to mesh with pinions $c^7$, $c^8$ and $c^9$ mounted on the counter-shaft $c^{10}$ driven through the worm wheel $c^{11}$ and worm $c^{12}$ by the gearing $c^{13}$ from the main drive shaft $c^{14}$. The pinion $c^7$ is free on the counter-shaft and permanently meshes with the pinion $c^4$, while the pinions $c^8$ and $c^9$ are keyed to the counter-shaft so that they are axially slidable thereon but always rotate with the counter-shaft. The pinions $c^8$ and $c^9$ are adapted selectively to mesh with the pinions $c^5$, $c^6$ under the control of selecting mechanism comprising the lever $d$, push rod $d^1$ and fork $d^2$. The pinions $c^7$ and $c^8$ are provided with dog clutches $c^{15}$ and $c^{16}$ which are also adapted to be engaged by movement of the pinion $c^8$ through said selecting mechanism. In one position, shown in Fig. 2, the drive takes place through the pinions $c^9$ and $c^6$, in a second position (not shown) through the pinions $c^8$ and $c^5$ and in a third position (also not shown), in which the dog clutches $c^{15}$ and $c^{16}$ engage, through the pinions $c^7$ and $c^4$. With this mechanism three changes in the speed with which the rope of plastic material is formed and fed by the rollers $b$ and $c$ can be obtained.

The shaft $e$ carrying the knife $e^1$ is continuously rotated by means of the chain sprocket $e^2$ and chain wheel $e^3$ from the main shaft of the machine (not shown). The knife is of segmental form, as shown in Fig. 2, and this is so mounted on the shaft that it can be readily removed and replaced by knives having a different segmental width.

The method according to this invention may be carried out by using the apparatus described in United States patent application Serial No. 652,761, filed 20th January 1933, assigned to the assignees of the present application, and in the accompanying drawings the mechanism already described in this specification is combined with such apparatus. In the earlier specification the apparatus comprises the rollers $b$ and $c$ for feeding a rope of plastic material to a cutting station where the knife $e^1$ is arranged intermittently to sever in succession a series of pieces from the end of the rope of plastic material, and a reciprocating pusher $f$ is arranged to move the pieces of plastic material as severed transversely of the direction of feed of the rope, while a displaceable trough $g$ is provided with mechanism for displacing the rope of plastic material out of the path of the pusher $f$ early in each forward stroke of the pusher, so as to avoid interference between the rope of plastic material and said pusher and for returning the rope of plastic material to its normal position towards the end of the return stroke of the pusher. The mechanism for displacing the trough $g$ comprises a lever $g^1$ pivoted on the shaft $c^1$ and connected by a link $g^2$ to a forked lever $g^3$ pivoted at $g^4$ and having bowls $g^5$ operable by the cams $g^6$ mounted on the shaft $g^7$ driven by the gear wheel $g^8$ from a suitable source of power (not shown).

In the adoption of such apparatus for carrying out the present invention, the action of the mechanism for displacing the trough $g$ is delayed in order to allow the rope to be fed against the knife, and the guide is caused to displace the rope only after the knife has moved clear of the end of the rope, so that the continued feed of this rope will not interfere with the return stroke of the pusher. The timing of this mechanism for displacing the trough $g$ may be adjustable in accordance with the segmental width of the knife.

In operation the rope of plastic material, marked $h$ in Fig. 1, which is formed and fed by the rollers $b$ and $c$ along the trough $g$ abuts with its leading edge against the knife $e^1$ and is thus compressed as long as the knife remains in the path of said rope. It will be apparent, therefore, that the amount of compression may be varied by varying the speed of rotation of the rollers $b$ and $c$. Further variation may be obtained by fitting knives $e^1$ of greater segmental width so as to extend the period of time during which the rope abuts against the knife.

What I claim as my invention and desire to secure by Letters Patent is:—

1. Apparatus for shaping, feeding and cutting plastic material to form uniform pieces comprising, continuously rotated forming rollers for forming said material into a rope and for feeding said rope endwise and a continuously rotated severing device disposed transversely of said rope and adapted to sever pieces from the end of said rope, said severing device forming an abutment against which the rope of plastic material is adapted to be compressed endwise.

2. Apparatus for shaping, feeding and cutting plastic material to form uniform pieces comprising, two forming rollers adapted to form said material into a rope, means for adjusting said rollers relatively to each other to vary the size of said rope, driving means adapted continuously to rotate said rollers, means for changing the speed of said rollers, and a severing device adapted to sever pieces from said rope, said severing device forming an abutment against which the end of said rope is adapted to be compressed endwise.

3. Apparatus for shaping, feeding and cutting plastic material to form uniform pieces comprising, continuously rotated forming rollers for forming said material into a rope and for feeding said rope endwise, and a detachable, segmental knife disposed transversely of said rope adapted to sever said rope and adapted also to form an abutment for compressing the end of the rope.

4. Apparatus for shaping, feeding and cutting plastic material to form uniform pieces, comprising, in combination, means for forming said material into a rope and continuously feeding said rope, a guide for supporting said rope, a knife at the end of said guide for intermittently severing in succession a series of pieces from the end of said rope, said knife also forming an abutment for the end of said rope against which it is adapted to be compressed endwise, a pusher for the severed pieces arranged to move transversely of the rope, and means for displacing said guide after the knife has moved clear of the end of said rope to avoid interference between the rope and the pusher, said displacing means returning the guide to bring said rope into the path of the pusher on the return of the pusher.

5. Apparatus for shaping, feeding and cutting plastic material to form uniform pieces, comprising, in combination, two forming rollers adapted to form said material into a rope, driving means for continuously rotating said rollers adapted continuously to feed said rope, means for changing the speed of said rollers, a guide for supporting said rope, a knife at the end of said guide for intermittently severing in succession a series of pieces from the end of said rope, said knife also forming an abutment for the end of said rope against which it is adapted to be compressed endwise, a pusher for the severed pieces arranged to move transversely of the rope, and means for displacing said guide after the knife has moved clear of the end of said rope to avoid interference between the rope and the pusher, said displacing means returning the guide to bring said rope into the path of the pusher on the return of the pusher.

6. Apparatus for shaping, feeding and cutting plastic material to form uniform pieces comprising, continuously rotated forming rollers for forming said material into a rope and for feeding said rope endwise, and an abutment adapted to pass across the end of said rope to compress it endwise, said abutment being adapted also to sever a piece from the end of said rope.

ALEXANDER RUSSELL.